United States Patent [19]

Andren et al.

[11] Patent Number: 5,732,105
[45] Date of Patent: Mar. 24, 1998

[54] METHOD OF ESTIMATING SIGNAL QUALITY IN A DPSK DEMODULATOR

[75] Inventors: Carl Frank Andren, Indialantic; Perry Wesley Frogge, Palm Bay; Leonard Victor Lucas, Palm Bay; Jim Snell, Palm Bay, all of Fla.

[73] Assignee: Harris Corporation, Melbourne, Fla.

[21] Appl. No.: 509,586

[22] Filed: Jul. 31, 1995

[51] Int. Cl.[6] .............................. H04B 3/46; H04B 17/00
[52] U.S. Cl. .......................... 375/226; 375/327; 375/330; 375/340; 375/355; 375/371; 329/304
[58] Field of Search ....................................... 375/226, 224, 375/227, 283, 284, 285, 324, 327, 330, 340, 346, 355, 371, 373, 376; 329/304

[56] References Cited

U.S. PATENT DOCUMENTS 5,001,724  3/1991  Birgenheier et al. .................... 375/226
5,490,177  2/1996  La Rosa et al. ......................... 375/340

Primary Examiner—Don N. Vo
Attorney, Agent, or Firm—Rogers & Killeen

[57] ABSTRACT

A method of estimating signal quality in a radio demodulator receiving an input stream of symbols includes the steps of sampling a phase-only portion of each of the symbols in the input stream, determining a phase error for each of the samples of the phase-only portions, and calculating a signal quality estimate from a plurality of the sample phase errors. The signal quality estimate may be an average magnitude of a predetermined number of sample phase errors. The input stream may be symbols in the preamble, or symbols in the data signal that follows.

15 Claims, 1 Drawing Sheet

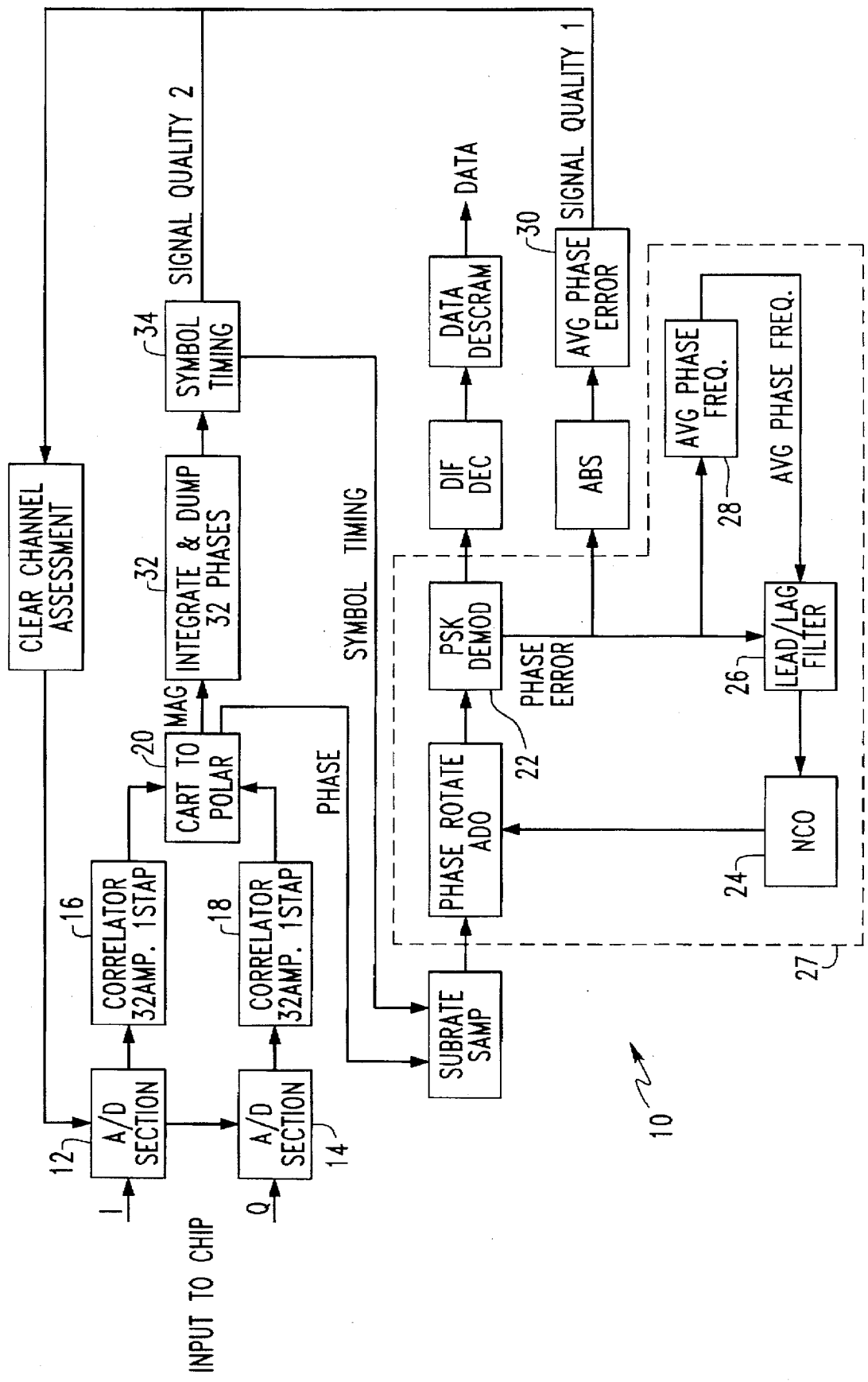

METHOD OF ESTIMATING SIGNAL QUALITY IN A DPSK DEMODULATOR

BACKGROUND OF THE INVENTION

This application is related to application Ser. No. 08/509,587 entitled Short Burst Acquisition Circuit for Direct Sequence Spread Spectrum Links; application Ser. No. 08/509,588 entitled Fast Acquisition Bit Timing Loop Method and Apparatus; application Ser. No. 08/509,589 entitled Short Burst Direct Acquisition Direct Sequence Spread Spectrum Receiver; application Ser. No. 08/509,590 entitled A/D Reference Level Adjustment Circuit to Maintain Optimum Dynamic Range at the A/D all of which are incorporated by reference, and are filed concurrently herewith and assigned to the assignee hereof.

The present invention is related to demodulators for radio receivers, and more particularly to a DPSK demodulator for a direct sequence spread spectrum radio receiver in which signal quality estimates include phase-only processing.

Design of demodulators for differential binary phase shift keyed (DBPSK) and differential quadrature phase shift keyed (DQPSK) data typically involves a trade-off between circuit complexity and performance. More specifically, signal quality estimates may be used in the demodulator to set the performance level of the demodulator; the more accurate the signal quality estimates, the better the performance of the demodulator. Additionally, the signal quality may be used in the acquisition decision process. The more accurate the signal quality estimates, the closer the decision point can be set to optimize the ratio of the probability of (correct) acquisition to the probability of false alarm. However, the circuit in the demodulator for providing the signal quality estimates increases in complexity and size as the accuracy of the signal quality estimate improves. Thus, the size and complexity of the demodulator are undesirably increased as its performance is improved.

A typical data transmission received at a DPSK receiver includes a data signal preceded by a preamble. The receiver is expected to acquire the preamble before attempting to demodulate the data signal that follows. The signal quality estimate is used to set various demodulator features, and is determined first during the preamble and updated during the data signal. In the prior art, signal quality estimates typically are bit sync amplitudes derived from correlators that receive I and Q components of the input stream of symbols (the term symbol is used herein to refer to the units used in the preamble format, e.g., spread spectrum BPSK, or in the data signal format, e.g., DBPSK or DQPSK). However, bit sync amplitudes provide an incomplete picture of signal quality. For example, they do not directly indicate any phase relationships.

Accordingly, it is an object of the present invention to provide a novel method of estimating signal quality in a radio receiver that takes advantage of phase-only processing, thereby obviating the problems of the prior art.

It is another object of the present invention to provide a novel method of estimating signal quality in a DPSK demodulator in which the phase-only portions of input symbols are sampled so that a phase error may be determined for each of the symbols.

It is yet another object of the present invention to provide a novel method of estimating signal quality in a DPSK demodulator in which phase errors derived from a plurality of samples of phase-only portions of input symbols are used as signal quality estimates.

It is still another object of the present invention to provide a novel method of estimating signal quality in a DPSK demodulator in which each symbol in a stream of symbols is sampled once and converted to polar coordinate form, in which a phase error for each of the samples is determined using a phase-only portion of the polar coordinate form, and in which a signal quality estimate is an average magnitude of a predetermined number of the sample phase errors.

It is a further object of the present invention to provide a novel method of estimating signal quality in a radio demodulator in which phase errors derived from a plurality of samples of phase-only portions of input symbols are provided from a phase locked loop.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 1 is a block diagram of an embodiment of the demodulator of the present invention.

DESCRIPTION OF PREFERRED EMBODIMENTS

An embodiment of the present invention for estimating signal quality in a radio demodulator receiving an input stream of symbols may include the steps of sampling a phase-only portion of each of the symbols in the input stream, determining a phase error for each of the samples of the phase-only portions, and calculating a signal quality estimate from a plurality of the sample phase errors. The input stream may be symbols in the preamble, or symbols in the data signal that follows.

In a preferred embodiment, the input stream of symbols is provided in I and Q components, and the I and Q components are combined for each of the symbols. The combined I and Q components for each of the symbols may be sampled at the rate of one sample per symbol, and the samples converted to a form that separates the magnitude and the phase, such as polar coordinate form. The phase-only portion of the polar coordinate form may be provided to a phase locked loop for determination of a phase error for each of the samples. Thereafter, an estimate of the signal quality may be provided by calculating an average magnitude of a plurality of the sample phase errors.

During the period when the signal is still being acquired (the preamble is still being received), the average magnitude may include the sample phase errors in a block of the symbols from the preamble received from an antenna. When more than one antenna is present, signal quality estimates may be provided for each antenna by using subsequent blocks of symbols from the preamble. Once the signal has been acquired and data are being demodulated, the signal quality estimate may be the average magnitude of a predetermined number of the sample phase errors, for example the average magnitude of phase errors from samples of 128 data symbols.

The use of the phase errors provides a robust signal quality estimate, even when the input signal is weak because the phase errors do not rely on signal amplitude. Further, the conversion to phase-only provides advantages to the rest of the demodulation functions. For example, the samples are real numbers, rather than complex numbers, so that phase rotation of the carrier can be compensated by a simple addition rather than a complex multiply. The decision structure for removing the DBPSK/DQPSK modulation involves additions and does not require comparators or complicated logic.

In a further embodiment, an average phase of a predetermined number of the symbols may be determined from the phase-only portions of the symbols. The average phase may be provided to the phase locked loop to remove frequency offsets.

In yet a further embodiment, an average of the magnitude-only portions of the polar coordinate form of the symbols (also denoted the bit sync amplitude) may be provided as a further signal quality estimate.

By way of further explanation, and with reference to FIG. 1, symbols in a received signal may be provided to a demodulator 10 for processing. I and Q components may be provided through analog to digital converters 12 and 14 to correlators 16 and 18 to remove the symbol spreading sequence. Outputs from correlators 16 and 18 may be combined and converted from cartesian to polar coordinate form in converter 20. The stream from converter 20 may be decimated to the symbol rate and the phase may be corrected for frequency offset before PSK demodulation in PSK demodulator 22. Phase errors from PSK demodulator 22 are fed to a numerically controlled oscillator 24 through a lead/lag filter 26 to achieve phase lock in phase locked loop 27.

Frequency offset is measured during signal acquisition and stored in processor 28 for use in demodulation. The frequency offset is estimated by averaging the phase rotation from symbol to symbol and then provided to phase locked loop 27 as an initial condition to accelerate phase lock, thereby saving time over the classical phase locked loops used in the prior art. The average magnitude of the phase errors for the symbols may be determined in calculating block 30 and provided as a signal quality estimate.

The magnitude of the output from converter 20 also may be provided to integrator 32 for integration. As will be appreciated, this eliminates the need (and the hardware) in the prior art to Doppler shift or to correct for oscillator offset prior to the correlator. The integrated output is provided to timer 34 for determination of symbol timing and bit sync amplitude. The bit sync amplitude is an average magnitude of the symbols in polar coordinates and is a measure of signal amplitude that also may be provided as a signal quality estimate.

During data demodulation the phase locked loop tracks and removes frequency offsets by subtracting the average phase. The demodulator switches from differential demodulation during acquisition to coherent demodulation followed by differential detection during data demodulation. This switch improves bit error rate performance.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of estimating signal quality in a DPSK demodulator receiving an input stream of symbols, the method comprising the steps of sampling a phase-only portion of each of the symbols in the input stream, determining a phase error for each of the samples, and calculating a signal quality estimate from a plurality of the sample phase errors.

2. The method of claim 1 further comprising the step of converting the symbols to a magnitude and phase form before sampling.

3. The method of claim 1 wherein the step of determining a phase error comprises the step of providing the phase-only portion to a phase locked loop for determination of the phase error for each of the samples.

4. The method of claim 3 further comprising the step of determining an average phase of a predetermined number of the symbols from the phase-only portions of the symbols.

5. The method of claim 4 further comprising the step of providing the average phase to the phase locked loop.

6. The method of claim 1 wherein the signal quality estimate is an average magnitude of a predetermined number of the sample phase errors.

7. A method of estimating signal quality in a DPSK demodulator in which the estimate of signal quality is used to establish a level of demodulation acquisition performance, the method comprising the steps of:

(a) sampling each symbol in a stream of symbols input to a DPSK demodulator;

(b) converting the samples to polar coordinate form;

(c) determining a phase error for each of the samples using a phase-only portion of the polar coordinate form; and (d) calculating a signal quality estimate from a plurality of the sample phase errors.

8. The method of claim 7 wherein the stream of symbols is a stream of data to be demodulated.

9. The method of claim 8 wherein the signal quality estimate is an average magnitude of a predetermined number of the sample phase errors.

10. The method of claim 7 wherein the stream of symbols is a preamble to a data signal.

11. The method of claim 10 wherein the signal quality estimate is an average magnitude of the sample phase errors in a block of the symbols received from a first antenna.

12. The method of claim 7 wherein each symbol is sampled once.

13. A method of estimating signal quality in a data radio demodulator comprising the steps of:

(a) providing I and Q components of a stream of data symbols to a data radio demodulator;

(b) combining the I and Q components for each of the symbols;

(c) sampling the combined I and Q components for each of the symbols at the rate of one sample per symbol (d) converting the samples to polar coordinate form;

(e) providing a phase-only portion of the polar coordinate form to a phase locked loop for determination of a phase error for each of the samples;

(f) calculating an average magnitude of a plurality of the sample phase errors; and (g) providing the average magnitude to an input to the demodulator as a signal quality estimate.

14. The method of claim 13 further comprising the steps of determining an average phase of a predetermined number of the symbols from the phase-only portions of the symbols, and providing the average phase to the phase locked loop.

15. The method of claim 14 further comprising the step of providing an average of magnitude-only portions of the symbols to the input to the demodulator as a further signal quality estimate.

* * * * *